(12) United States Patent
Bergerot et al.

(10) Patent No.: US 7,594,324 B2
(45) Date of Patent: Sep. 29, 2009

(54) METHOD OF ASSEMBLING A TURBOMACHINE

(75) Inventors: Francois Pierre Andre Bergerot, Dammarie les Lys (FR); Laurent Leeder, Saint Germain les Corbeil (FR); Jacques Pierre Felix Malterre, Moisenay (FR); Bernard Adrien Edmond Souart, Savigny le Temple (FR); Hubert Thomas, Savigny le Temple (FR)

(73) Assignee: SNECMA, Paris (FR)

( * ) Notice: Subject to any disclaimer, the term of this patent is extended or adjusted under 35 U.S.C. 154(b) by 362 days.

(21) Appl. No.: 11/466,652

(22) Filed: Aug. 23, 2006

(65) Prior Publication Data
US 2007/0044307 A1 Mar. 1, 2007

(30) Foreign Application Priority Data
Aug. 26, 2005 (FR) ................... 05 52577

(51) Int. Cl.
*B21D 39/03* (2006.01)
*B21D 53/78* (2006.01)
*B21K 25/00* (2006.01)
*F03D 11/00* (2006.01)
*F01D 25/00* (2006.01)

(52) U.S. Cl. .................. 29/889.2; 29/428; 29/447; 29/889; 29/889.21; 29/889.3; 29/889.4; 29/889.5; 415/142; 415/229; 416/244 R

(58) Field of Classification Search .................. 29/428, 29/447, 889.2, 889.21, 889.3, 889.4, 889.5; 384/581; 415/113, 142, 229; 416/244 R
See application file for complete search history.

(56) References Cited

U.S. PATENT DOCUMENTS

| 2,756,561 | A | * | 7/1956 | Morley ....................... 60/791 |
| 2,862,356 | A | * | 12/1958 | Kent et al. .................... 60/791 |
| 3,909,085 | A | * | 9/1975 | Wilkinson et al. ........... 384/517 |
| 4,167,809 | A | * | 9/1979 | Boyland et al. ................ 29/800 |
| 4,283,096 | A | * | 8/1981 | Picard et al. ................... 384/557 |
| 5,201,796 | A | * | 4/1993 | Glinski et al. ................. 60/792 |
| 7,062,847 | B2 | * | 6/2006 | Haimer ......................... 29/800 |

FOREIGN PATENT DOCUMENTS

| FR | 2 515 734 | 5/1983 |
| FR | 2 644 843 | 9/1990 |
| GB | 2 177 160 A | 1/1987 |

* cited by examiner

*Primary Examiner*—David P Bryant
*Assistant Examiner*—Alexander P Taousakis
(74) *Attorney, Agent, or Firm*—Oblon, Spivak, McClelland, Maier & Neustadt, L.L.P.

(57) ABSTRACT

A method of assembly of a turbomachine that includes a first module and a second module with a second shaft assembled by a bearing, the bearing including an outer ring shrink-fitted inside a journal integral with the first module and an inner ring integral with the second shaft. The second module is assembled on the first module by engagement of the second shaft, with the inner ring, inside the journal. The method includes a step of inserting the second module in the first module up to a determined distance such that the first and second modules are only partially assembled. The second shaft is centered with respect to the journal, the centering being controlled on the basis of measuring distance deviations with respect to a reference on the journal. The journal is expanded by heating its outer surface. After the step of expanding, the second module is displaced inside the first module so as to complete the assembly. This displacement step is started based on a predetermined temperature.

9 Claims, 5 Drawing Sheets

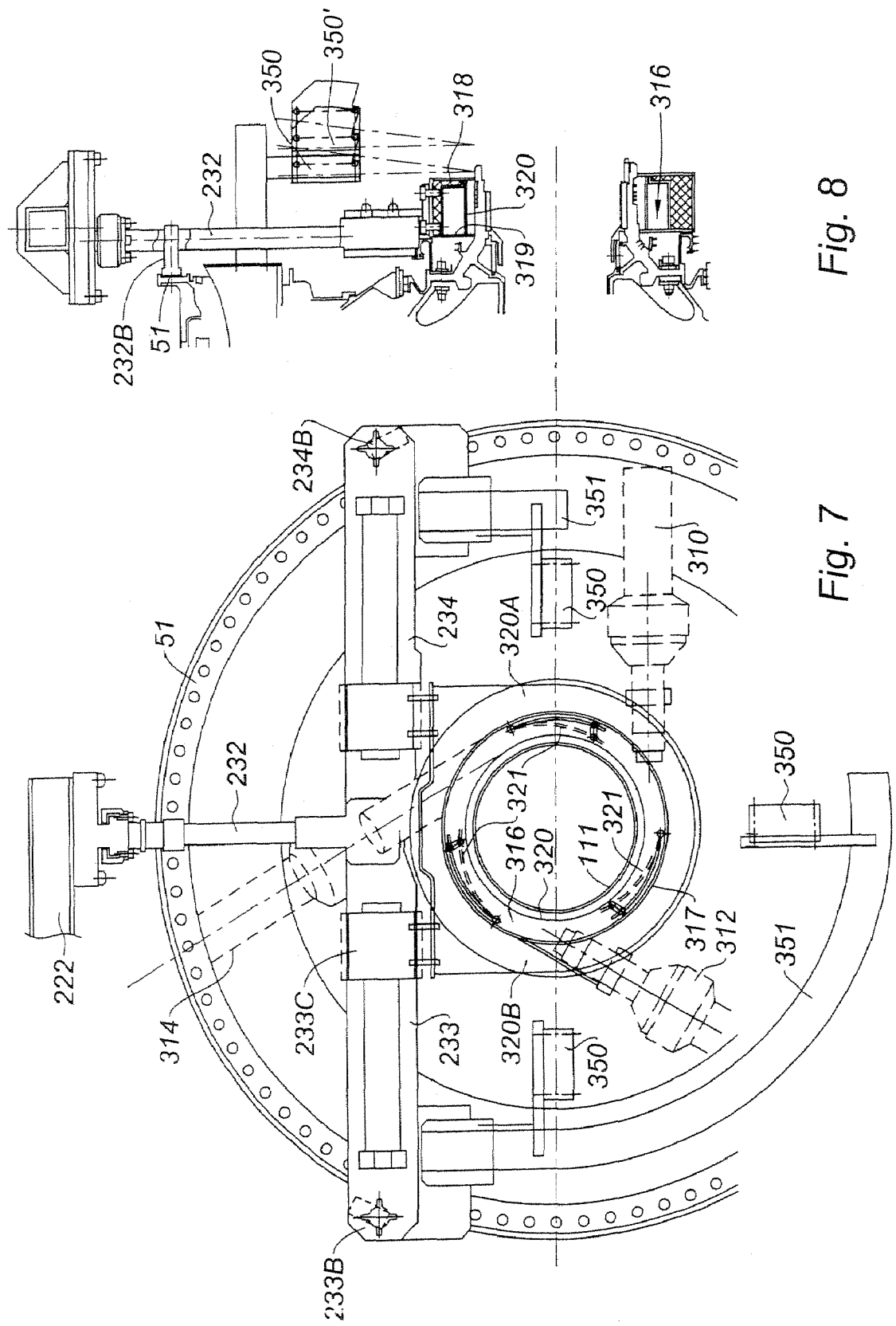

METHOD OF ASSEMBLING A TURBOMACHINE

BACKGROUND OF THE INVENTION

The present invention relates to the field of turbomachines and relates more particularly to multibody gas turbine engines. It relates to engine assembly operations and in particular to the fitting of the low pressure turbine module to a high pressure body.

DESCRIPTION OF THE PRIOR ART

A turbojet with a front turbofan and a double body, for example, comprises a low pressure (LP) body and a high pressure (HP) body. The LP body rotates at a first speed and the LP turbine drives the fan. The HP body rotates at a speed different from that of the LP turbine. The shafts of the two bodies are concentric, the low pressure shaft is guided in rotation in bearings supported by the fixed structure of the engine, respectively situated downstream of the turbine and upstream of the high pressure compressor. The shaft of the high pressure body is guided in rotation by bearings supported by the fixed structure of the engine upstream and by the shaft of the low pressure body by means of downstream inter-shaft bearings. The latter are of the roller bearing type and situated, at least according to a known engine, between the high pressure turbine and the low pressure turbine. The bearing comprises an inner ring equipped with rollers held by a cage on the LP shaft and an outer ring shrink fitted in the HP shaft. The fitting of this bearing, that is to say the assembly of the outer ring with the assembly formed by the rollers, of the cage and of the inner ring, is carried out at the same time as the mating of the low pressure turbine where the shaft, previously fitted to the low pressure turbine, is guided into the high pressure body. The term "mating" here refers to all or part of the translational movement of the LP turbine module until the flange of the outer casing of the latter comes into contact with the corresponding flange of the HP module.

It follows that the assembly of the inter-shaft bearing is carried out blind. The operator has no visibility for monitoring, in particular, the engagement of the rollers in the HP rotor and then in the outer ring. This operation comprises high risks of damage to the bearing if the conditions are not controlled. The highest risk for the bearing is a hard contact between the rollers and the retaining nut of the outer ring and the ring itself.

At present, the means used do not make it possible to fit the LP turbine without risk to this inter-shaft bearing, because of the heating method used and of the imprecise positioning of the LP turbine. In particular, the heating of the HP part (equipped with the outer ring) is carried out from the inside of the journal by means of a diffuser fed by a heater. The temperature measurement is carried out manually using a probe applied against the outside of the HP part. The investigations carried out on this operating method have revealed several disadvantages:

a relatively high heterogeneity, of the order of 20° C., of the temperature levels of the heated parts,
  a high risk of adding pollution by the ambient air taken for the heating and the heating device itself, and
  a high risk of damage of the outer ring of the bearing by contact with the diffuser. This risk is particularly high as the clearance between the diffuser and the outer ring is only a few millimeters, and the assembly is installed on rollers and therefore presenting a risk of being moved inadvertently by the operators.

SUMMARY OF THE INVENTION

The objective of the invention is to improve the assembly conditions of LP turbines on an engine of the type described above in order to reduce the risks of damaging the inter-shaft bearing.

More generally, the invention relates to the assembly of a turbomachine, in particular of a gas turbine engine, comprising at least a first module and a second module with a bearing comprising an outer ring shrink-fitted inside a journal integral with the first module and an inner ring integral with the second shaft, according to which the second module is assembled on the first module by engagement of the second shaft, with said inner ring, inside the journal comprising said outer ring.

According to the invention the desired objectives are achieved with an assembly method wherein it comprises the following steps:

mating the second module with the second shaft inside the first module up to a determined distance from the journal,
  centering the second shaft with respect to the journal, said centering being controlled on the basis of measuring distance deviations with respect to a reference on the journal,
  expansion of the outer ring by heating the external surface of the journal,
  completion of the mating of the second module.

In the particular case described above, the first module is the HP body and the second module is the low pressure turbine LP, the journal being in the extension of the shaft, the first shaft, and integral with it, of the HP body and the second shaft being the LP turbine shaft.

However, the journal can also be a hollow part, fixed or mobile in rotation, which forms the support of the outer ring of the bearing.

By controlling the centering of the shaft with respect to the journal, correct positioning is guaranteed, which allows, once the journal is expanded, trouble-free mating. Moreover, the heating of the journal from the outside frees space allowing the engagement of the shaft and consequently reduces the assembly time.

According to another feature of the method, in a step prior to the mating of the second module, the journal is heated for the fitting of the outer ring in the HP journal.

The inner ring is preferably equipped with the rolling element of the bearing. In particular, the rolling element consists of rollers held together in a cage.

Preferably, an annular heating means is put into position on the journal between the mating step and the expansion of the journal by heating. During this step, the temperature of the journal or of the ring is measured and the heating is controlled until a determined temperature is reached.

According to another feature of the method, the mating of the second module is carried out when the measured values of the temperatures and of the distance deviations with respect to the journal are within predetermined limits, assuring a trouble-free assembly.

The invention also relates to the device for the implementation of the method, comprising a mobile frame supporting an annular journal-heating means, at least one temperature probe arranged to measure the temperature of the journal, and a means of measuring the radial distance deviation between a shaft to be fitted in the journal and a reference on the journal.

Preferably, the support of the heating means on the frame is arranged to allow the positioning of the heating means around the journal on the one hand and in a retracted position on the other hand. More particularly, the frame comprises a means forming a stop to immobilize the frame with respect to the fixed module of the engine.

According to another feature of the method, the annular heating means comprises a hot gas annular diffuser fed by at least two heaters. Advantageously, the temperature measuring probe is integral with the heating means. The means of measuring radial distance deviations between the reference and the shaft is integral with the frame, and with the heating means in particular.

The device can also comprise a control means receiving the temperature measurement signal and the distance measurement signal, and indicating the thermal and geometric corrections whilst providing the information indicating if the mating can be completed in accordance with the imposed quality criteria.

BRIEF DESCRIPTION OF THE DRAWINGS

Other features and advantages will emerge on reading the following description of a non-limiting embodiment of the invention, applied to the fitting of a low pressure turbine module in the high pressure body of a double-body gas turbine, given with reference to the appended drawings in which:

FIG. 7 shows a detail of the heating device in the position of use;

FIG. 8 is an axial cross-sectional view of the device shown in FIG. 7 in position;

DESCRIPTION OF THE PREFERRED EMBODIMENTS

Figure 1:
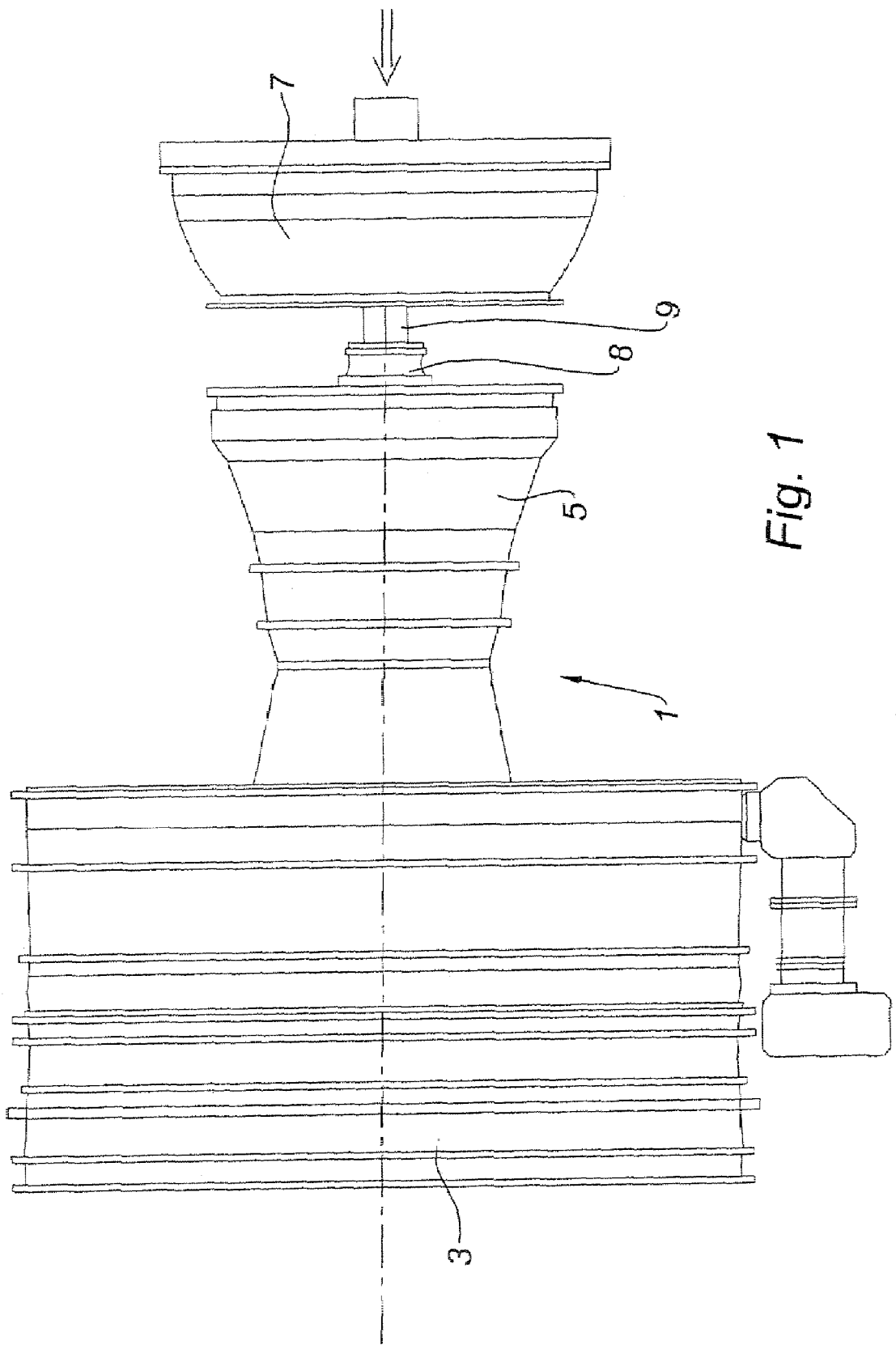
FIG. 1 shows an engine in the process of assembly.

FIG. 1 shows an engine in the process of assembly in which only the outer casings are seen. In this case it is a double-body bypass turbojet such as the CFM56. It comprises a front fan 3 and a module 5, called the first module, constituted by the HP body with its shaft, called the first shaft. These components are already assembled. In this view the LP turbine module 7, called the second module, whose shaft 9, called the second shaft, is already engaged in the HP body, is in the process of being fitted. The critical zone is situated in zone 8 of the inter-shaft bearing whose visibility is zero.

In the continuation of the description, the fitting of this second module, the low pressure module, into the first module, the high pressure module, is therefore described.

Figure 2:
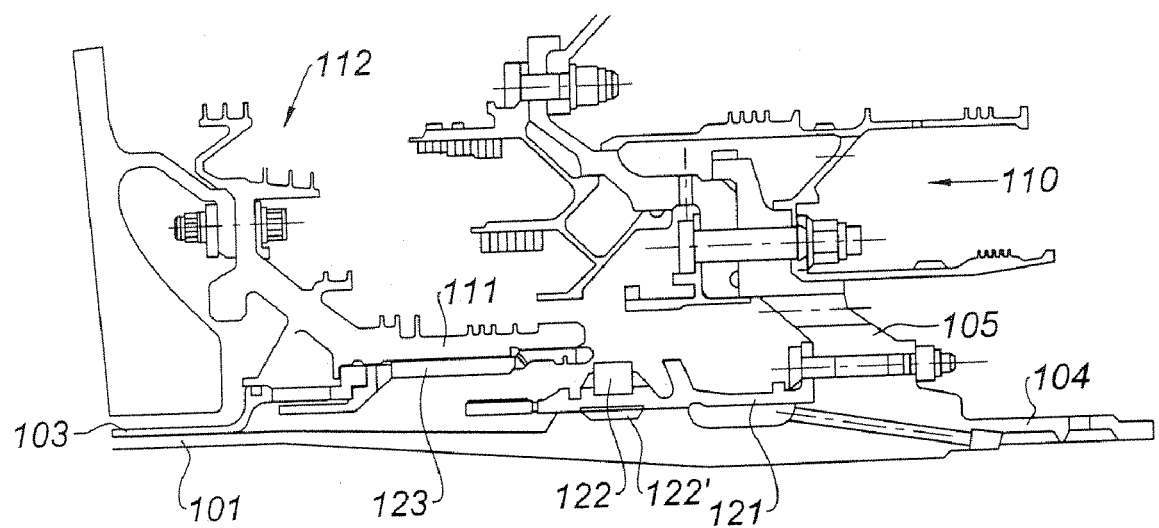
FIG. 2 shows a detail of the inter-shaft bearing before assembly.

In FIG. 2, this zone is seen in cross-section and in greater detail. The shaft 101, the second shaft of the second module, the LP turbine, is housed in the shaft 103, the first shaft, of the first module, the HP body. The shaft 101 comprises at its end, on the right of the figure, a journal 104 for the fitting of a bearing. A radial flange 105 allows the fitting of the various components constituting the LP turbine 110, which is partly visible.

The shaft 103 of the HP body is extended by a journal 111 at its downstream end. Only a part of the turbine 112 of the HP body can be seen.

Figure 3:
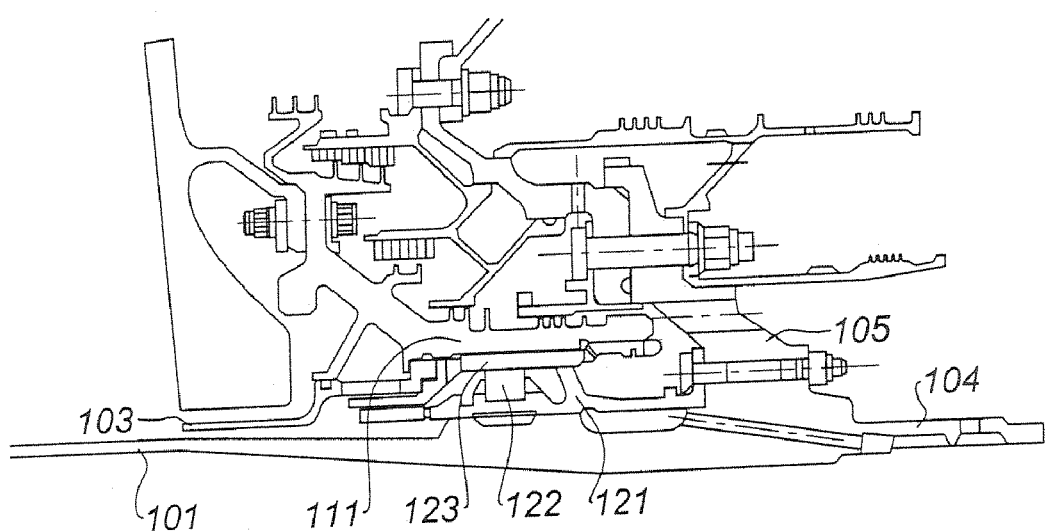
FIG. 3 shows the same zone as FIG. 2, after assembly.

The inner-shaft bearing 120, known per se, comprises an inner ring 121, fixed to the shaft 101 with the rolling elements, such as rollers 122, whose cage 122' is crimped on the ring 121. The outer ring 123 is shrink fitted inside the journal 111. It is locked in position by a nut 125. FIG. 3 shows the same components after assembly. The assembly is carried out by translational displacement of the LP turbine module 110 with the shaft 101 towards the left with respect to FIG. 2, after expansion of the journal together with the outer ring, by heating, the HP module being fixed. It is understood that because of low tolerances, there is a great risk of contact between the rolling parts. This contact can be the cause of scratches, grooves or spalling initiators which are able to result in the fracture of the bearing.

The applicant company has developed a piece of equipment allowing a secure fitting of the LP module in this environment.

Figure 6:
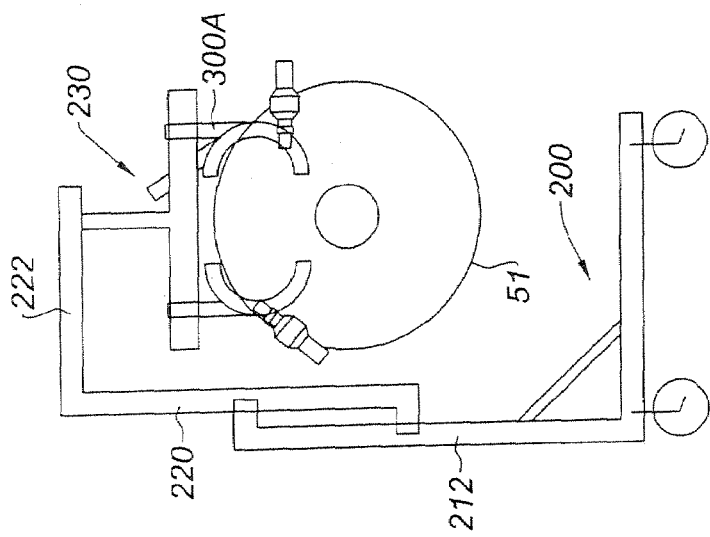
FIGS. 4 to 6 show an equipment supporting a heating device, in the position of use and in a retracted position respectively.
Figure 5:
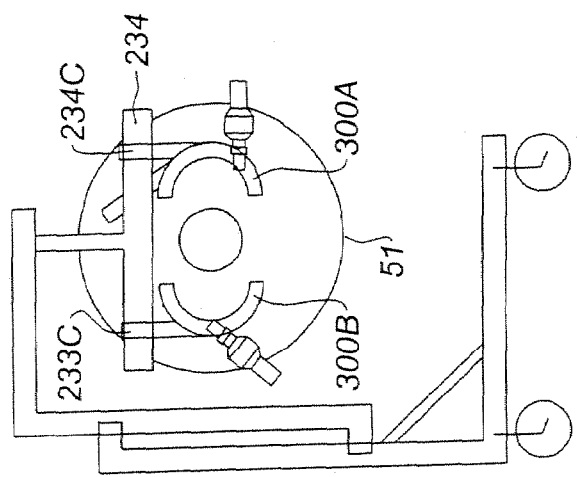
Figure 4:
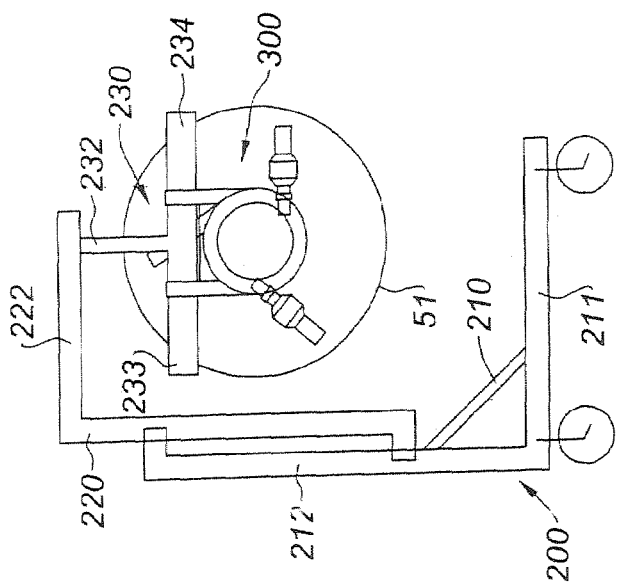

The equipment 200 comprises a mobile frame 210, from which is suspended a means of heating the HP body journal. This assembly is shown in FIGS. 4, 5 and 6 in several positions.

The frame 210 comprises a carriage 211, mounted on rollers, with a vertical frame member 212. A support beam 220 is mounted on this frame member provided with rails in order to be able to slide between a first low, active or operating, position, shown in FIG. 4, and a second high, retracted position, which is seen in FIG. 6.

A support 230 in the form of an inverted T is fixed to the end of the horizontal arm 222 of the support beam 220.

The support 230 comprises a vertical arm 232 rigidly fixed with respect to the horizontal arm 222 of the support beam, and two horizontal branches 233 and 234. The latter are arranged to support two sliders 233C and 234C each supporting one half of the annular heating device 300, 300A and 300B respectively, as seen in FIG. 7.

The equipment is shown in the active position in FIG. 4. The support 230 is bearing against the flange 51 of the casing of the HP body module. Starting from this position, the heating device is released by separating the two halves 300A and 300B which move in direction parallel with the two branches 233 and 234 with their respective slider 233C and 234C. Once the heating device is open, it is distanced in the upward direction by commanding the sliding of the support beam 220 in the rails of the frame member 212. The equipment is shown in the high retracted position in FIG. 6.

The putting of the heating device into position is carried out using the reverse sequence.

Figure 9:
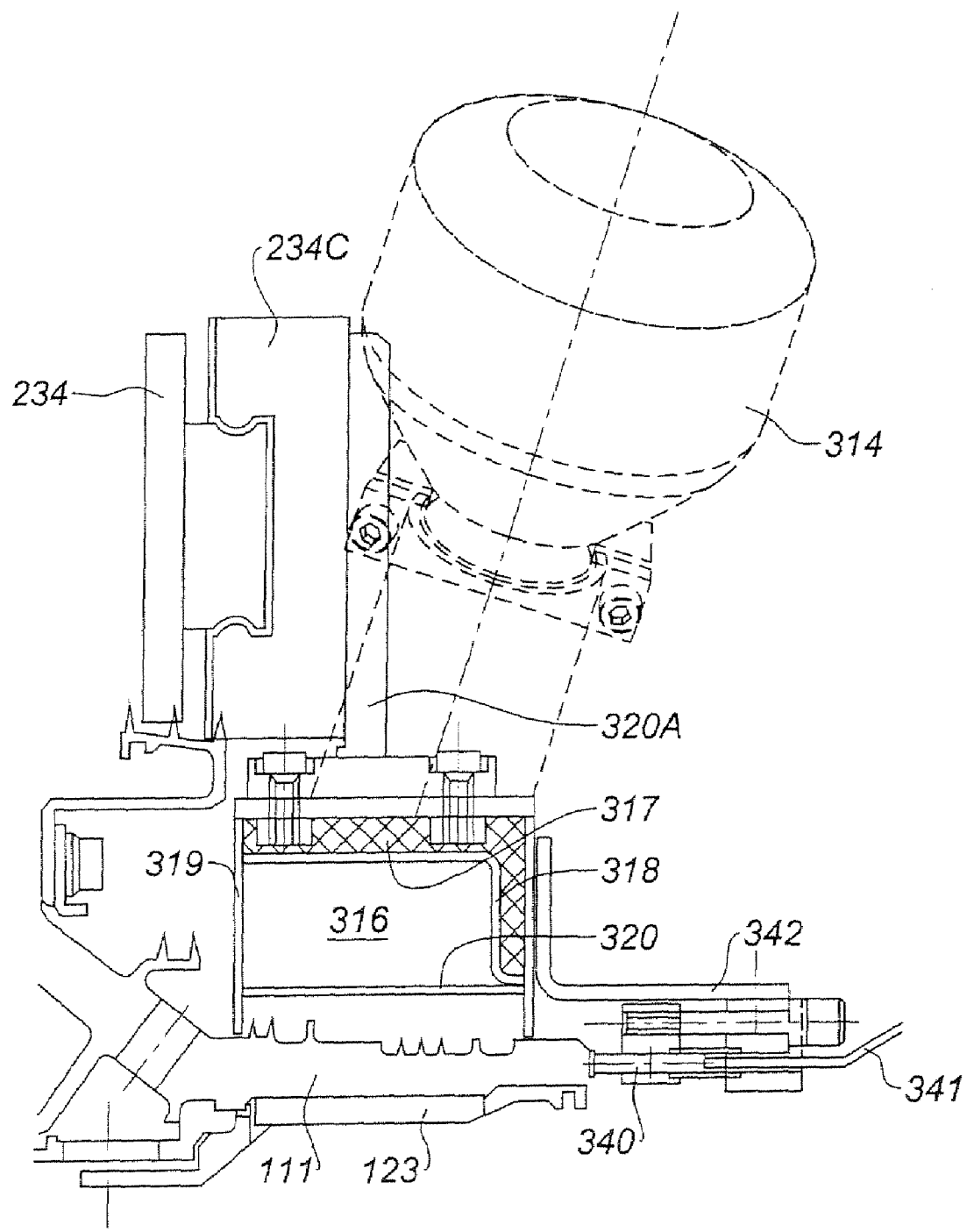
FIG. 9 illustrates a detail of the device showing a temperature sensor.

The heating device is described in more detail with reference to FIGS. 7, 8 and 9. FIG. 7, which is an enlarged view of FIG. 4, shows the heating device with three heaters 310, 312 and 314, in dotted line, disposed substantially tangentially with respect to an annular enclosure 316 forming a diffuser and air distributor. They are equidistant from each other and deliver a gas heated to a controlled temperature, air in particular, along at least one tangential component. In FIG. 9 it can be seen that the heaters, because of the bulk of the suspension cannot be disposed strictly tangentially with respect to the annular chamber 316. The latter is delimited by a cylindrical casing 317 and two walls 318 and 319, perpendicular to the axis of the engine. An inner cylindrical wall 320 is perforated and forms a space with the journal 111. The casing comprises a thermally insulating material as can be seen on the walls 317 and 318.

Deflectors 321 are disposed inside the annular enclosure between two consecutive heaters. These deflectors are arched and inclined towards the axis of the engine. The end receiving the gaseous flow from an adjacent heater is at a greater distance from the axis than is the other end. In this way the gas flows emerging into the enclosure are simultaneously driven in a rotational movement about the axis of the engine with a centripetal component towards the perforated wall 320.

The wall 318 towards the end of the journal comes into contact with the latter. The wall 319 on the other side forms a space or openings for the passage of the gasses which will heat up the thicker mass at that place of the journal. The components of the jacket 317, 318, 319 defining the annular enclosure 316 are made of two parts attached to their respective supports 320 A and B. These supports are themselves each suspended from a slider 233C and 234C respectively.

The support 230 bears against the flange 51 by stops, one of which is visible in FIG. 8. It is the stop 232B integral with the vertical arm 232 of the support. The arm 233 and 234 also comprise chocking means 234B and 233B which can be seen in FIG. 7. The chocks are retractable and become positioned behind the flange 51 in order to ensure the immobilization of the support on the flange 51.

The device serves as a support for three thermocouples 340 distributed equidistant from each other. FIG. 9 is a partial cross-sectional view of the heating device 300 at the level of one of the thermocouples 340. The latter is bearing against the downstream surface of the journal in order to sense the temperature. A cable 341 connects the sensor to the control unit which, in particular, comprises the function of controlling the heaters according to the temperature to be reached. In this example, it is seen that the thermocouple is attached to the wall 318 by means of a bracket 342.

The device also supports three instruments 350 for measuring the distance between the journal 111 and the LP shaft inside the latter. They are distributed equidistant from each other, for example at three o'clock, six o'clock and nine o'clock, as seen from the rear of the engine. The alignment of the LP shaft is carried out by comparing the differences in measurements of distances at these three points and by correlatively acting on the transverse positioning of the shaft in the handling system. The distance measuring instruments 350 are of the laser type for example. They have been shown diagrammatically in FIGS. 7 and 8. They are mounted on support arms 351 fixed on the horizontal arms of the supports 230. They can move between two positions as seen in FIG. 8 which shows a measuring instrument positioned high with respect to the axis of the engine. When they are in position 350 of the figure, they aim at the journal; by shifting them into the position 350', they aim at the low pressure shaft. It is thus possible to derive from this the clearance between the shaft and the journal. The three together distributed around the journal make it possible to know the relative position of the two axes accurately. The correction is carried out by moving the turbine module in space using the appropriate control means.

A control console is mounted on the frame. It receives the signals from the temperature sensors and the distance measurements. It also comprises means for providing alarm signals, for example of the green light/red light type, to inform the operator of the situation and of the state of preparation of the journal before mating.

The sequence of operations is as follows.

The engine is partially assembled. The fan 3 and the HP body 5 are assembled. The LP module 7 is waiting.

a) For fitting the outer ring 123 in the journal,
the device is put into position as shown in FIG. 7, and
the journal 111 is heated up to the temperature specified for the fitting; the obtaining of this temperature authorizes the putting into the retracted position, as shown in FIG. 6, the fitting of the ring 123, and the tightening of the nut 125;

b) For the centering of the turbine shaft,
the equipment is put into the operating position,
the LP shaft 101 is inserted into the HP body, and
the distance measuring system 350 is activated. The measurements taken by the instruments 350 allow the centering of the shaft 101, within the limits specified, with respect to the journal.

c) For the heating of the journal/outer ring assembly,
the equipment is put into the operating position, and
the heating is started. The heating is controlled according to the temperatures measured by the thermocouples 340 until the commanded temperature is reached, to within the specified limits. The obtaining of the temperature within the specified range authorizes the putting of the equipment into the retracted position.

The assembly is completed by proceeding with the final mating.

The device of the invention provides everything with the simultaneous control of the two major assembly conditions in order to ensure risk-free assembly of the bearing.

It is furthermore understood that the invention is not limited to the fitting of the LP turbine in an HP body of a gas turbine engine. It is applicable to all equivalent situations of fitting a second module assembled by a bearing in a first module.

The invention claimed is:

1. A method of assembly of a turbomachine comprising at least a first module and a second module with a second shaft to be assembled by a bearing, said bearing comprising an outer ring shrink-fitted inside a journal integral with the first module and an inner ring integral with the second shaft, according to which the second module is to be assembled on the first module by engagement of the second shaft, with said inner ring, inside the journal comprising said outer ring, said method of assembly comprising the following steps:
    inserting the second module in the first module up to a determined distance such that said first and second modules are only partially assembled,
    centering the second shaft with respect to the journal, said centering being controlled based on measuring distance deviations with respect to a reference on the journal,
    expanding the journal by heating an outer surface of said journal after said inserting and centering steps, and
    after said step of expanding, displacing said second module inside said first module, said displacing being carried out in translation so as to complete the assembly of said first and second modules, wherein said displacing is started based on a predetermined temperature produced by said heating of the outer surface of the journal.

2. The method as claimed in claim 1, the engine being a double-body engine, wherein the first module is the high pressure (HP) body and the second module is the low pressure (LP) turbine, and the second shaft being the LP turbine shaft.

3. The method as claimed in claim 2, wherein the first module comprises a first shaft, the journal being in its extension and integral said first shaft.

4. The assembly method as claimed in claim 1, further comprising a step, prior to the step of inserting the second module in the first module, of heating the journal and shrink-fitting the outer ring in said journal.

5. The method as claimed in claim 4, further comprising putting into position on the journal an annular heater between the step of inserting and the step of expending the journal by heating.

6. The method as claimed in claim 5, wherein said predetermined temperature is the temperature of the journal or of the outer ring, further comprising measuring said temperature of said journal or of the outer ring during said step of expending, and controlling the heating until said predetermined temperature is reached.

7. The method as claimed in claim 6, wherein starting said step of displacing the second module is carried out only after said temperature of said journal or of the outer ring and the distance deviations with respect to the journal are within predetermined limits.

8. The method as claimed in claim 1, wherein said heating is performed by exposing said outer surface of said journal to heated gas from a plurality of heaters disposed outside said journal.

9. The method as claimed in claim 8, wherein said measuring of the distance deviations during said step of centering is performed with a plurality of lasers disposed outside said journal.

* * * * *